US012068923B2

(12) United States Patent
Jain et al.

(10) Patent No.: US 12,068,923 B2
(45) Date of Patent: Aug. 20, 2024

(54) PATH COMPUTATION WITH DIRECT ENFORCEMENT OF NON-LOCAL CONSTRAINTS

(71) Applicant: Ciena Corporation, Hanover, MD (US)

(72) Inventors: Ankur Jain, Gurgaon (IN); Suvendu Kumar Barik, Noida (IN); John Wade Cherrington, Salt Spring Island (CA)

(73) Assignee: Ciena Corporation, Hanover, MD (US)

( * ) Notice: Subject to any disclaimer, the term of this patent is extended or adjusted under 35 U.S.C. 154(b) by 382 days.

(21) Appl. No.: 17/493,945

(22) Filed: Oct. 5, 2021

(65) Prior Publication Data

US 2023/0057874 A1  Feb. 23, 2023

(30) Foreign Application Priority Data

Aug. 23, 2021 (IN) .............................. 202111037994

(51) Int. Cl.
*H04L 41/12* (2022.01)
*H04L 41/042* (2022.01)
*H04L 41/044* (2022.01)
*H04L 41/0803* (2022.01)

(52) U.S. Cl.
CPC ............ *H04L 41/12* (2013.01); *H04L 41/042* (2013.01); *H04L 41/044* (2013.01); *H04L 41/0803* (2013.01)

(58) Field of Classification Search
CPC ...................................................... H04L 41/12
See application file for complete search history.

(56) References Cited

U.S. PATENT DOCUMENTS

| 7,187,672 | B1* | 3/2007 | Vishnu ................... H04Q 11/06 370/386 |
| 7,890,654 | B1 | 2/2011 | Tadimeti et al. |
| 8,335,850 | B2 | 12/2012 | Benedetto et al. |
| 8,625,460 | B2 | 1/2014 | Dutt et al. |
| 10,033,623 | B2 | 7/2018 | Jain et al. |
| 2005/0025075 | A1 | 2/2005 | Dutt et al. |
| 2008/0219268 | A1* | 9/2008 | Dennison ............ H04L 12/4633 370/395.2 |
| 2013/0202299 | A1* | 8/2013 | Prakash .............. H04J 14/0271 398/51 |
| 2020/0120109 | A1* | 4/2020 | Shu ........................ H04L 63/20 |
| 2021/0218635 | A1 | 7/2021 | Cherrington et al. |
| 2022/0004865 | A1* | 1/2022 | Sawal ...................... G06N 3/08 |

FOREIGN PATENT DOCUMENTS

| CN | 107005335 A | * | 8/2017 | ........... H04B 10/516 |
| CN | 107528745 A | * | 12/2017 | ............. H04L 41/06 |

* cited by examiner

*Primary Examiner* — Samina F Choudhry
(74) *Attorney, Agent, or Firm* — Baratta Law PLLC; Lawrence A. Baratta, Jr.

(57) ABSTRACT

Systems and methods include creating a graph of a network having i) vertices representing ports, and ii) edges representing possible connections between vertices; receiving a request for one or more paths in the network; traversing the graph to determine the one or more paths; responsive to encountering a non-local constraint in the graph, adding a traversal state based thereon; and responsive to satisfying the non-local constraint in the graph, removing the traversal state based thereon.

20 Claims, 9 Drawing Sheets

PATH COMPUTATION WITH DIRECT ENFORCEMENT OF NON-LOCAL CONSTRAINTS

FIELD OF THE DISCLOSURE

The present disclosure generally relates to networking. More particularly, the present disclosure relates to systems and methods for path computation with direct enforcement of non-local constraints.

BACKGROUND OF THE DISCLOSURE

Path computation in a network involves finding a suitable route for data between a source (ingress) and destination (egress) subject to constraints, policy, costs, weights, etc. The general approach for path computation is to use graph theory where each network node or network element is a vertex, and each link connecting the nodes are edges. With this abstraction, the path computation process becomes a graph problem to find paths by traversing the graph, such as executing a shortest path algorithm (e.g., Dijkstra's algorithm) to find one or more (k) shortest paths. There are cases in network path computation where the pre-validation of a constraint cannot be done directly on original routing graph; in many cases this arises when individually each edge is valid but certain edges cannot come in the path because of some other edge that is already selected in the path. As described herein, a constraint is something that limits graph traversal during shortest path execution.

Outside the ultra-local case where immediately adjacent edges can be filtered based on vertex, we refer to this circumstance as a "non-local" ingress-egress constraint. In its simple unmodified form, Dijkstra's algorithm has no mechanism to discard such edges because it only tracks the least cost of each vertex and the last vertex from where it came with lowest cost. That is, Dijkstra's algorithm does not have a memory during graph traversal, so only ultra-local constraints can be addressed.

The conventional approach for handling these non-local constraints includes generating a large number of paths without checking the non-local constraints. Essentially, you work in the context of a k-shortest path algorithm for which k is set to very large number, effectively generating all possible paths. The constraint is then checked for each path, and we stop out when we have either exhausted all paths or hit the user target for number of paths. Because many paths will fail to satisfy this property, this approach means path generation runs to large k. This is costly both time and memory in a way directly follows from k-shortest path complexity. As this is also sensitive to network size, as network size grows the slow-down will be more pronounced.

BRIEF SUMMARY OF THE DISCLOSURE

The present disclosure relates to systems and methods for path computation with direct enforcement of non-local constraints. The solution proposed here is to introduce what we define as a traversal state whose setting/propagation within Dijkstra is equivalent to path traversal on an extended graph in which non-local constraints are exactly enforced a priori. With the conventional approach described above, the k-shortest path algorithm was computing thousands of invalid paths before returning the result and therefore taking time in minutes. With the approach as disclosed herein, the results come in milliseconds. In summary, we see three to four orders of magnitude improvement in practice on standard Path Computation Element (PCE) test networks.

In various embodiments, a method including steps, a processing device configured to implement the steps, and a non-transitory computer-readable medium having instructions for the steps are provided. The steps include creating a graph of a network having i) vertices representing ports, and ii) edges representing possible connections between vertices; receiving a request for one or more paths in the network; traversing the graph to determine the one or more paths; responsive to encountering a non-local constraint in the graph, adding a traversal state based thereon; and, responsive to satisfying the non-local constraint in the graph, removing the traversal state based thereon. The steps can include, responsive to encountering an edge where the non-local constraint applies, ignoring any edge that does not satisfy the non-local constraint.

The ports can include line ports and client ports associated with a network element. The vertices can also include vertices representing connectivity between the line ports and the client ports of a given network element, and vertices representing connectivity between the client ports of two different network elements. The vertices representing connectivity between the line ports and the client ports of a given network element are internal connections in the given network element, and the vertices representing connectivity between the client ports of two different network elements are cabled connections. The non-local constraint can include a requirement that an exit client port matches an entry client port. The traversal state can include nested non-local constraints. The traversal state can include multilayer non-local constraints. The traversing the graph can utilize Dijkstra's algorithm.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for path computation with direct enforcement of non-local constraints. The solution proposed here is to introduce what we define as a traversal state whose setting/propagation within Dijkstra is equivalent to path traversal on an extended graph in which non-local constraints are exactly enforced a priori.

In particular, we offer in this disclosure:
(a) motivating use cases from current challenges in network management PCE.
(b) proof that the traversal state formulation is correct, disallowing all invalid paths from consideration while leaving open all valid paths to consideration.
(c) proof that the introduction does not put undue memory pressure on the Dijkstra heap during run-time.
(d) generalization to the nested non-local constraint case and its application to multi-layer use case.
(e) applicability of this approach to the multi-domain, federated PCE problem space.
(f) empirical results demonstrating the effectiveness of this technique in several specific use cases.

Example Network

Figure 1:
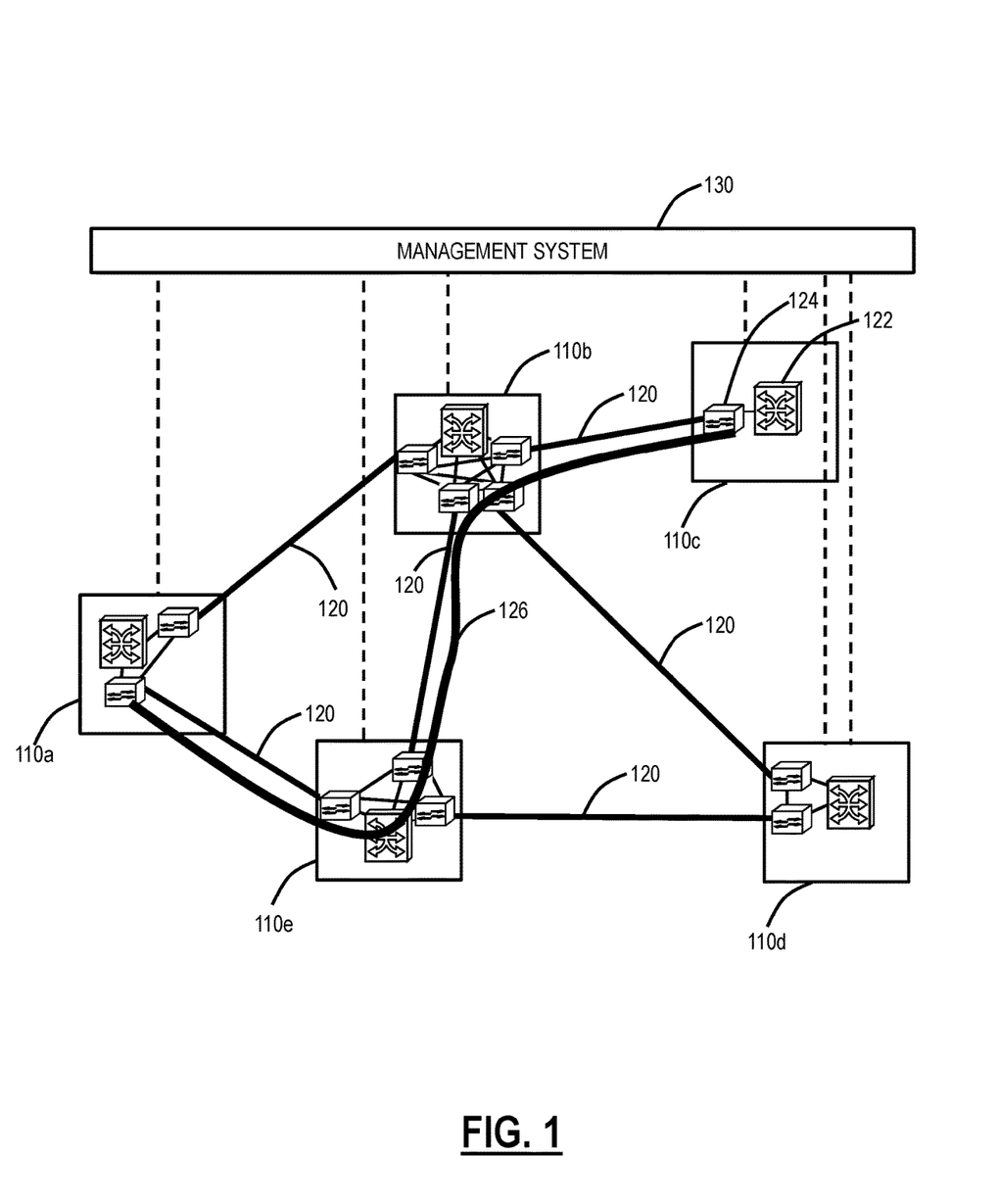
FIG. 1 is a network diagram of an example network with five interconnected sites.

FIG. 1 is a network diagram of an example network 100 with five interconnected sites 110a, 110b, 110c, 110d, 110e. The sites 110 are interconnected through a plurality of links 120. Each of the sites 110 can include a switch 122 and one or more Wavelength Division Multiplexing (WDM) network elements 124, as well as other network elements and devices omitted for simplicity. The switch 122 is configured to provide services at Layers 1 (e.g., OTN/SONET/SDH), Layer 2 (e.g., Ethernet, Multilayer Protocol Switching (MPLS), etc.), Layer 3 (e.g., Internet Protocol (IP), and the like as well as combinations thereof. The WDM network elements 124 provide the photonic layer (e.g., Layer 0) and various functionality associated therewith (e.g., multiplexing, amplification, optical routing, wavelength conversion/regeneration, local add/drop, etc.). Of note, while shown separately, those of ordinary skill will recognize the switch 122 and the WDM network elements 124 may be realized in the same network element. The photonic layer can also include intermediate amplifiers and/or regenerators on the links 120, which are omitted for illustration purposes. The network 100 is illustrated, for example, as an interconnected mesh network, and those of ordinary skill in the art will recognize the network 100 can include other architectures, with additional sites 110 or with fewer sites, with additional network elements and hardware, etc. The network 100 is presented herein as an embodiment for implementing the path computation systems and methods.

The sites 110 communicate with one another optically over the links 120. The sites 110 can be network elements which include a plurality of ingress and egress ports forming the links 120. Further, the nodes 110 can include various degrees, i.e., the site 110c is a one-degree node, the sites 110a, 110d are two-degree nodes, the site 110e is a three-degree node, and the site 110b is a four-degree node. The number of degrees is indicative of the number of adjacent nodes at each particular node. The network 100 is illustrated with a connection 126 between the sites 110a, 110c and through the sites 110b, 110e. The connection 126 can be a Subnetwork Connection (SNC), Label Switched Path (LSP), or any other end-to-end connection that can utilize the path computation systems and methods. Further, the connection 126 can include various different aspects such as a wavelength, Time Division Multiplexing (TDM) traffic, packet traffic, and a combination therein.

The preceding descriptions focus on L0/L1 aspects of the network 100. Additionally, the network 100 can include other components forming L2 and/or L3 connections in the network 100, such as routers, switches, packet-optical transport systems, and the like. That is, the network 100 can include Ethernet, Virtual Local Area Network (VLAN), MPLS, IP, etc. connections as well. In an embodiment, path computation systems and methods can operate at a single Layer (L0, L1, L2, or L3), and in another embodiment, the path computation systems and methods can operate at multiple layers.

The network 100 can include a management system 130 that can provide an interface for Operations, Administration, Maintenance, and Provisioning (OAM&P) functions. The management system 130 can include functionality to perform path computation, such as a PCE. The term management system 130 is used herein to denote any type of management plane, including a Network Management System (NMS), Element Management System (EMS), planning system, Software Defined Networking (SDN) controller, control plane, etc.

Specifically, the present disclosure provides path computation systems and methods. Those skilled in the art will recognize these can be implemented at the management system 130, as well as in-skin (locally on a network element). The preceding description utilizes the term "PCE" to denote an element associated with the network 100 for performing path computation. The PCE may be a conventional PCE element, but can also be a software module implemented at any of the management system 130 and in-skin at a network element.

Motivating Use Cases

A path in the network 100 is considered valid for connection setup based on the availability of the switch 122, the links 120, and sufficient bandwidth available thereon, in addition to the various aspects described herein with respect to the constrained path computation systems and methods. The present disclosure includes a non-local constraint which is described as follows with reference to OTN at Layer 1. Those skilled in the art will recognize other protocols and layers are also contemplated. Also, various network elements 122 are described herein with a low port count, merely for simplicity of illustration.

Figure 2:
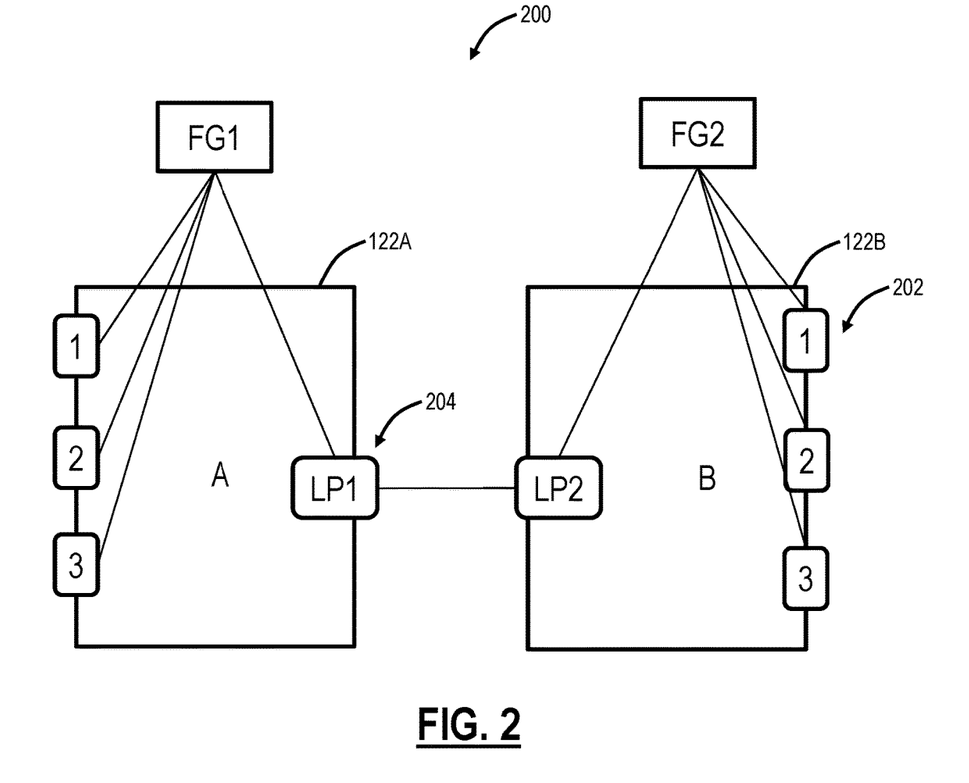
FIG. 2 is a diagram of a graph of a network illustrating a book-ended base case, i.e., a simple two-network element case.

FIG. 2 is a diagram of a graph 200 of a network illustrating a book-ended base case, i.e., a simple two-network element 122A, 122B case. For illustration purposes, the network elements 122A, 122B each have three client ports 202, labeled 1, 2, 3, and one line port 204, labeled LP1, LP2. The graph 200 also includes two forwarding groups FG1, FG2. The forwarding groups FG1, FG2 are vertices in the graph 200 to denote functionality within a network element 122A, 122B. In this example, the client ports 202 all connect to the line port 204. Note, the term network element is used interchangeably with the term node herein.

Book-ended base case: In the OTN domain, there are some book-ended configurations for modules, such as a 10×10 G multiplexer or a Layer 2 muxponder, where there is a constraint in which the exit port needs to be same as entry port. This is because there are fixed timeslots on the line port 204 associated with each of the client ports 202. For example, if we enter from Port 1 to the line port LP1, then from the line port LP2 on the other side, we can exit via Port 1 only. All the client ports 202 can connect to the line port 204 in the graph 200, but with the constraint, we enter from client port 1 on network element 122A, and we can only exit from Port 1 of network element 122B. In such a configuration a path found from Port 1 on the network element 122A through $A_{LP1} \rightarrow B_{LP2} \rightarrow B_2$ (exiting on Port 2 of the network element 122B) is for example invalidated in post processing by conventional approaches.

In the present disclosure, this entry port must match the exit port is an example of a non-local constraint. In a conventional graph traversal, there would be three shortest paths from port 1 on the network element 122A—to each of the ports 1, 2, 3 on the network element 122B.

Figure 3:
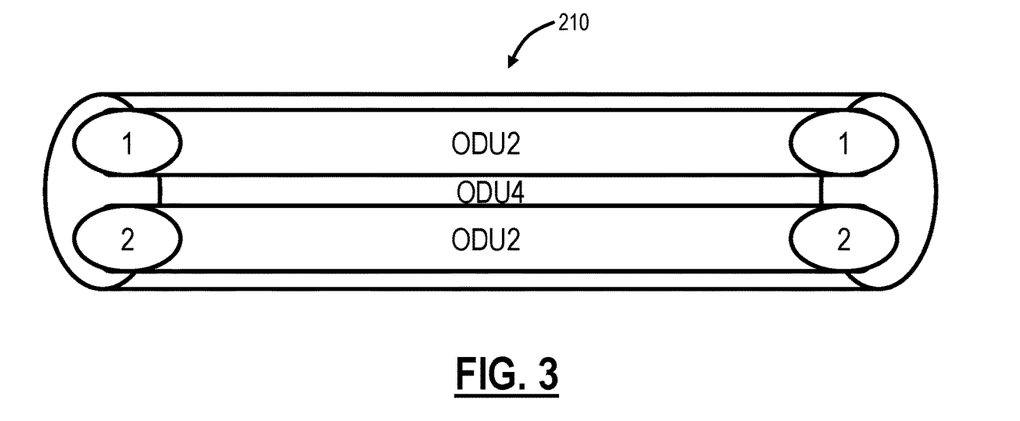
FIG. 3 is a diagram of a logical view of an OTN connection illustrating the non-local constraint.

FIG. 3 is a diagram of a logical view of an OTN connection 210 illustrating the non-local constraint. In the example in FIGS. 2 and 3, the client ports 202 are Optical Data Unit level 2 (ODU2) (10 G) rate and the line port 204 is an Optical Transport Unit level 4 (OTU4) (100 G) rate, so there are 10 client ports which get multiplexed on the OTU4 line with unique tributary port/timeslot information and the same structure is demultiplexed on the other side of the line. The OTN connection 210 shows two example ODU2s in the ODU4 and the fixed mapping.

Figure 4:
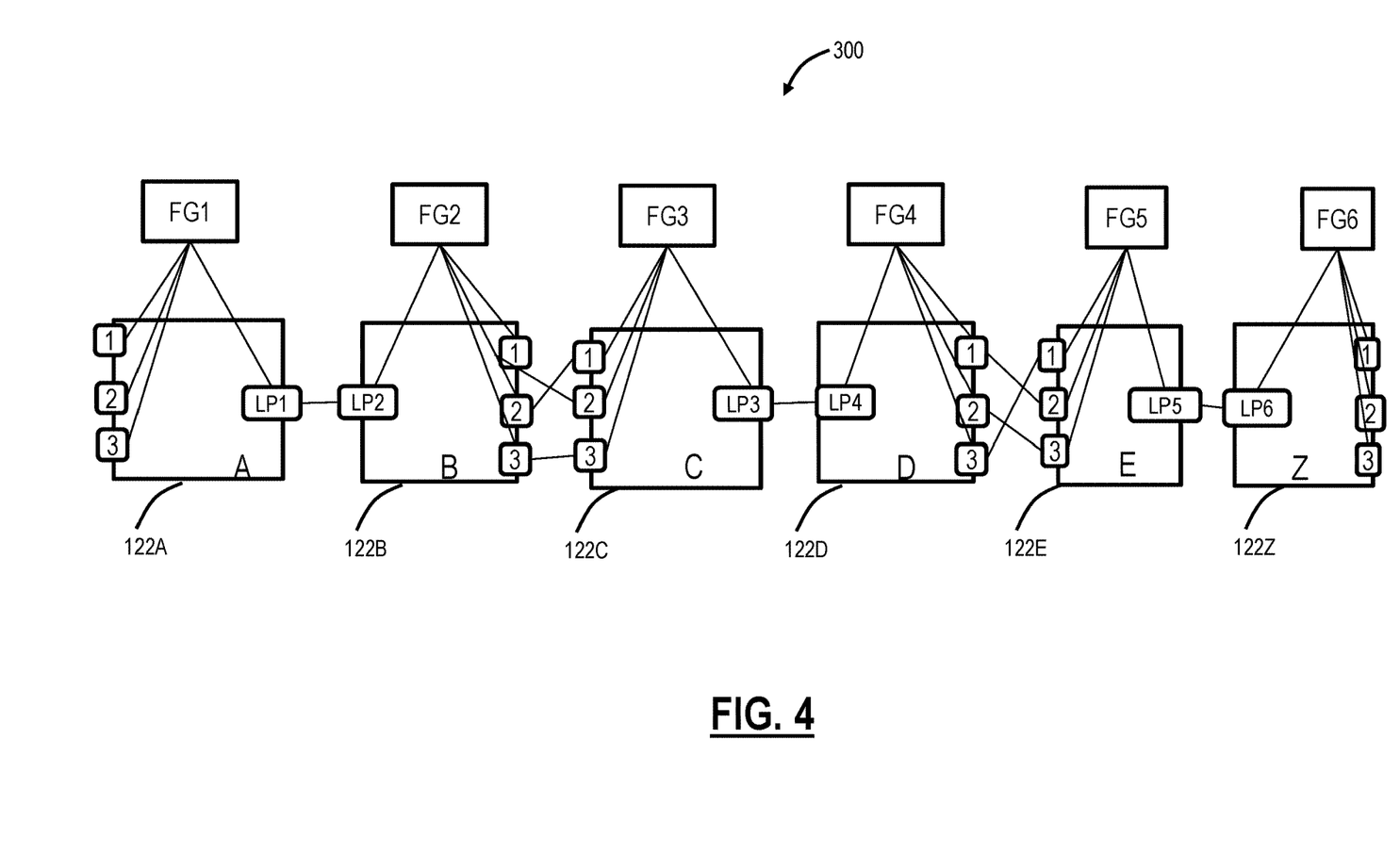
FIG. 4 is a diagram of a graph of a network illustrating a book-ended extension case, i.e., a multiple network element case.

FIG. 4 is a diagram of a graph 300 of a network illustrating a book-ended extension case, i.e., a multiple network element 122A, 122B, 122C, 122D, 122E, 122Z case. For the foregoing descriptions, the terms nodes A, B, C, D, E, Z will be used to refer to the network elements 122A, 122B, 122C, 122D, 122E, 122Z, respectively. The term A1 would refer to client port 202 on the node A. Also, there is a forwarding group FG1, FG2, FG3, FG4, FG5, FG6 for each of the nodes A, B, C, D, E, Z, respectively.

In such cases, the number of invalid paths increases exponentially based on client regenerator hops. In the graph 300, if we enter from port 1 on node A then we can exit only via port 3 on node Z by traversing edges as mentioned below A1-FG1, FG1-LP1, LP1-LP2, LP2-FG2, FG2-B1, B1-C2, C2-FG3, FG3-LP3, LP3-LP4, LP4-FG4, FG4-D2, D2-E3, E3-FG5, FG5-LP5, LP5-LP6, LP6-FG6, FG6-Z3.

But the below sequence of edges from port 1 on node A to port 3 on node Z is invalid.

A1-FG1, FG1-LP1, LP1-LP2, LP2-FG2, FG2-B2, B2-C1, C1-FG3, FG3-LP3, LP3-LP4, LP4-FG4, FG4-D1, D1-E2, E2-FG5, FG5-LP5, LP5-LP6, LP6-Z3

Specifically, the constraint of port A1 requires the same port on the node B, namely B1, so LP2-B2 (via LP2-FG2 and FG2-B2) is invalid, but there is no way detect this conventionally. There can be N such invalid connectivity in the above diagram (depending on the number of client ports and fibering between the client ports) and with a greater number of hops the invalid path combination also grows. This might still look manageable with post-processing since the fiber connectivity is fixed and pre-provisioned.

Figure 5:
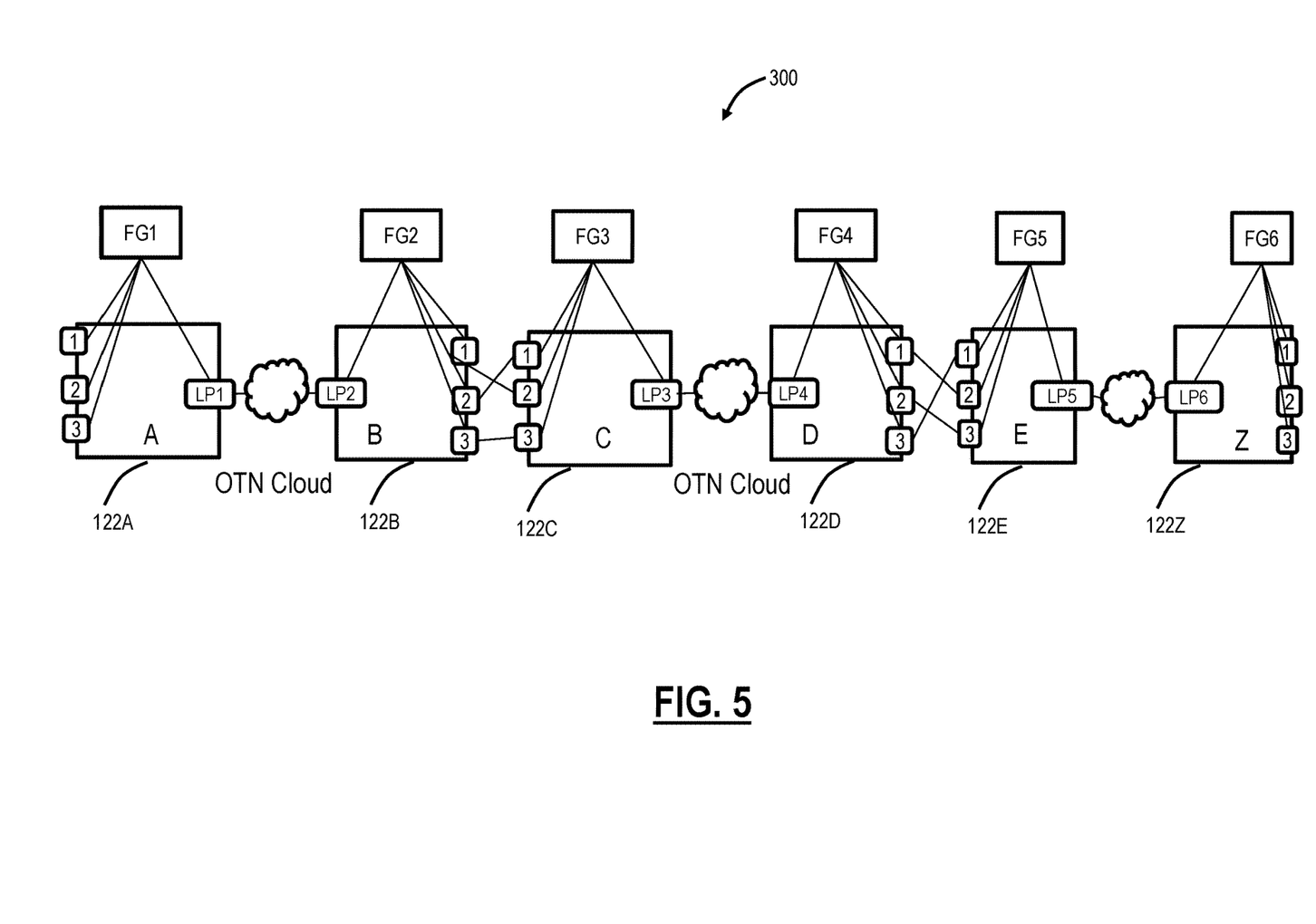
FIG. 5 is a diagram of the graph with OTN clouds between various line ports.

FIG. 5 is a diagram of the graph 300 with OTN clouds between various line ports. The connectivity between LP1-LP2, LP3-LP4, LP5-LP6 is not just direct fibering rather there can be network clouds with arbitrary many nodes and edges.

Figure 6:
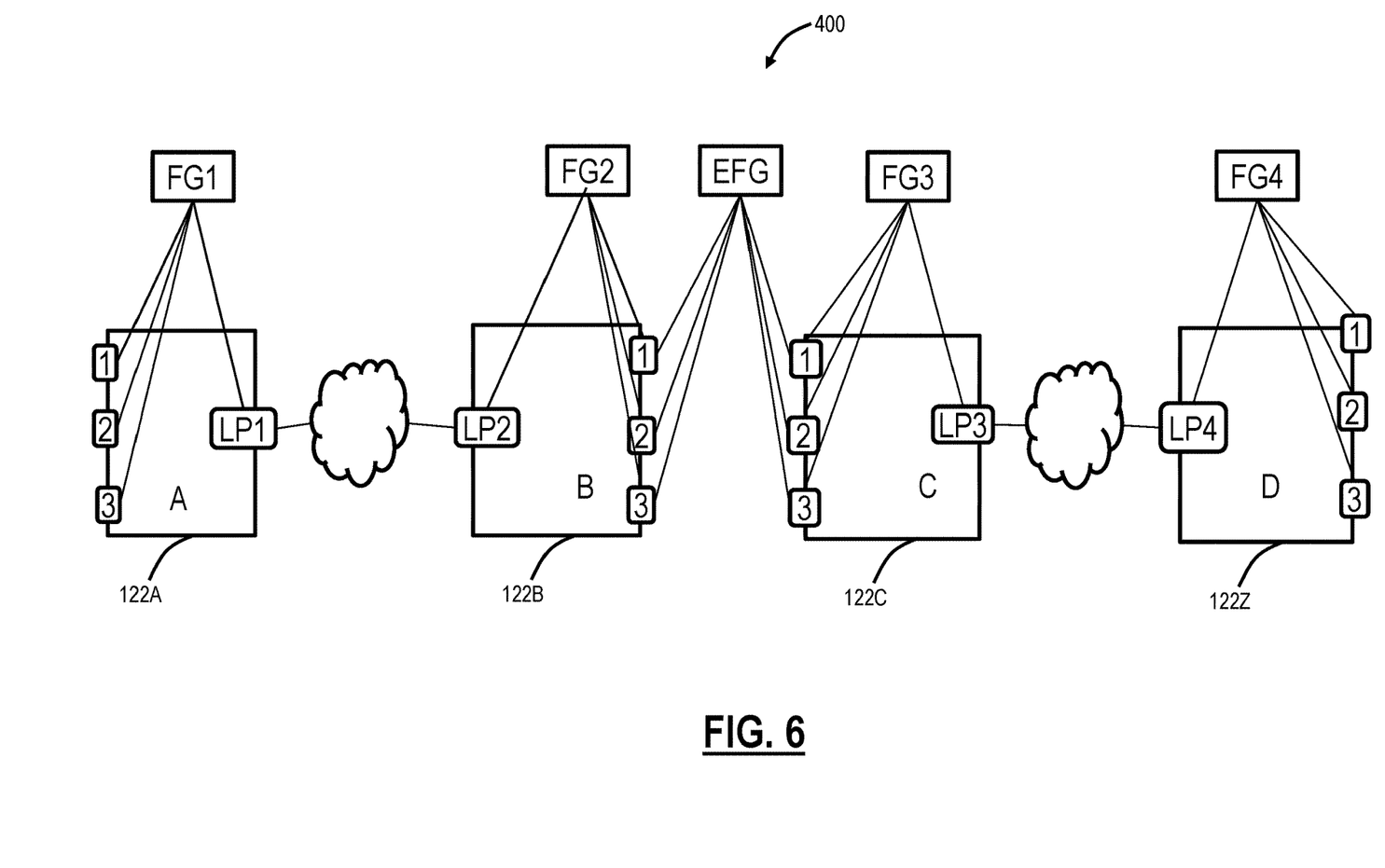
FIG. 6 is a diagram, of a graph with OTN clouds and with possible fibering between two nodes B, C.

FIG. 6 is a diagram, of a graph 400 with OTN clouds and with possible fibering between two nodes B, C. This fibering creates a significant issue with the conventional approach. In general, the customer may have these multiple client cards on a hub site, where they can do re-fibering to take traffic in different directions. This means that the PCE graph must assume that all client ports on a hub site can connect to any other client port and this is what is modeled by another FG call EFG (external FG). The external forwarding group EFG denotes a physical connection, e.g., client port to client port connected by optical fiber. This multiplies the permutation of paths that you can have between source and destination and most of the paths will eventually turn out to be invalid.

In example shown in FIG. 6, if we try to find a route from $A_1$ (Node A, Port 1) to $D_5$ (Node D, Port 2), then paths like: $A_1 \rightarrow A_{LP1} \rightarrow B_{LP2} \rightarrow B_1 \rightarrow (EFG) \rightarrow C_1 \rightarrow C_{LP4} \rightarrow D_{LP5} \rightarrow D_2$ are all invalid.

The only valid path is: $A_1 \rightarrow A_{LP1} \rightarrow B_{LP2} \rightarrow B_1 \rightarrow (EFG) \rightarrow C_2 \rightarrow C_{LP4} \rightarrow D_{LP5} \rightarrow D_2$.

In summary, while the EFG does a single path to go from different number ports on ultimate ingress and ultimate egress, it also opens up a huge amount of invalid paths which is devastating for the post-validation approach.

Traversal State Approach

The present disclosure includes a traversal state that is used to denote and check the non-local constraint. To understand why the traversal state to be introduced shortly works, we start from an expanded graph construction.

Let $G^{(o)}$ be the original routing graph on which conventional Dijkstra would run, e.g., the graphs 200, 300, 400. For each port p subject to a non-local ingress/egress constraint, we conceive of a full copy of G called $G^{(p)}$. This graph is identical to the original graph $G^{(o)}$ except it is missing the forbidden edges at egress port p' incompatible with entering on p.

Having formed $G^{(p)}$ for each constrained ingress port p, we then form a new working routing graph G' consisting of $G^{(o)}$ but where edges leaving any ingress/egress restricted port p leads instead to the suitable pruned copy $G^{(p)}$; the allowed egress edges in turn re-connect to $G^{(o)}$.

Routing on this modified graph construction G' has two properties:

(1) Any paths violating ingress/egress constraint are impossible by construction.
(2) All paths that do meet the ingress/egress constraint are available.

An apparent problem introduced by this construction is, without any further modifications, it will have expanded the routing graph in size to: (original memory footprint of graph)×(number of ingress/egress pairs), since we create a copy $G^{(p)}$ for each ingress egress pair in the above construction. Note this is a pessimistic upper bound, as the subgraph between ingress and egress may be smaller than the full original graph; it however a strict upper bound that is useful in understanding the limit where graph size of cloud portions may grow to dominate the sub-graphs that can come between ingress/egress.

As the resulting routing graph may already occupy a significant memory footprint, this creates an unwelcome tension between run-time improvement versus memory cost. To resolve this tension, we can introduce an implicit representation of this extended graph construction using the concept we call "traversal state."

This traversal state is a per-vertex property introduced after the ingress point and carried forward after validation of next edge as we traverse edges (i.e., it is pushed as a label on the associated vertices, in alignment with moving to extended graph). When we hit the exit vertex satisfying the traversal criteria then the corresponding traversal state should be removed. For any edge that violates the traversal state, the edge can be discarded.

An introduction of traversal state splits the original vertex and creates a new vertex with properties of the original vertex and the traversal state. This way, a Dijkstra walk reaching a vertex through different predecessors will each create a copy of the vertex with unique traversal state and that vertex traversal state will be further applied to all other successors in the similar way until we reach a vertex where the traversal state gets reset.

Figure 7:
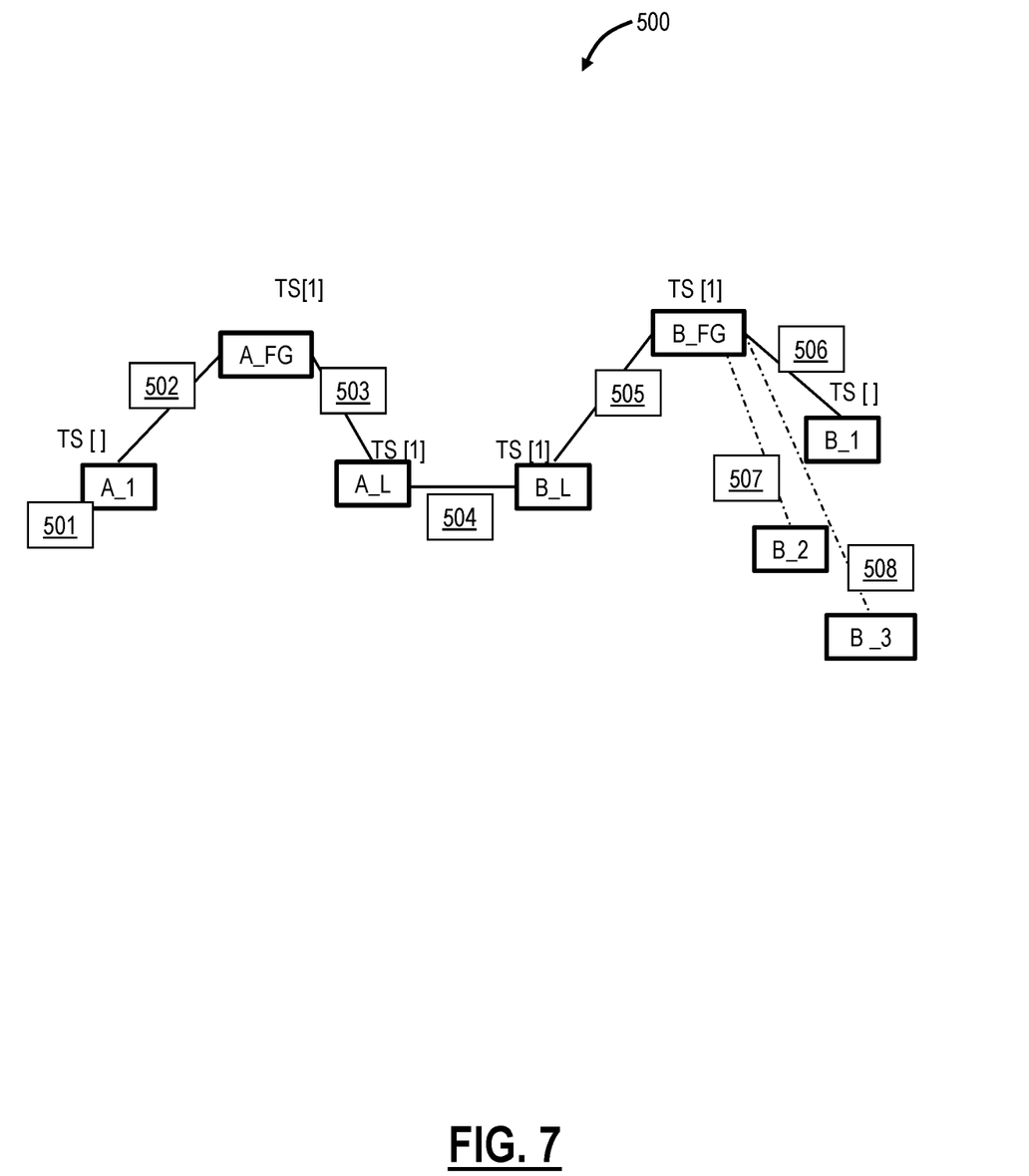
FIG. 7 is a diagram of the graph showing use of the traversal state.

FIG. 7 is a diagram of the graph 200 showing use of the traversal state. The traversal state is denoted as TS[x] where x is a port where the non-local constraint is added. The following is an explanation of how we use this in our example configuration of the graph 200 with an example process 500.

At step 501, the start node is $A_1$, and the traversal state (TS) is empty. At step 502, the process moves to the Edge $A_1 \rightarrow A_{FG}$, a new vertex with traversal state for $A_{FG}$ as [1] is created based on the edge traversed, the new vertex $A_{FG}[1]$ will have the same outgoing edges as $A_{FG}$. At step 503, the process 500 moves to Edge $A_{FG}[1] \rightarrow A_L$, valid edge, traversal state of $A_L$ is [1] carried forward as the edge doesn't violate the traversal state and $A_L[1]$ vertex is created.

At step 504, the process 500 moves to Edge $A_L[1] \rightarrow B_L[1]$, same as above traversal state of $B_L$ is [1] carried forward. At step 505, the process 500 moves to Edge $B_L[1] \rightarrow B_{FG}[1]$ same as above traversal state of $B_{FG}$ [1] carried forward. At step 506, the process 500 moves to Edge $B_{FG}[1] \rightarrow B_1$, edge destination matches the traversal state of 1, exit criteria satisfied traversal state reset to empty [ ] on $B_1$ and $B_1$ vertex is not split.

At step 507, the process 500 moves to $B_{FG}[1] \rightarrow B_2$ but the edge destination violates the existing traversal state of 1, as to reach $B_2$ the traversal state must be 2, edge rejected. At step 508, the process 500 moves to $B_{FG}[1] \rightarrow B_3$—same as Step 507 violates traversal state.

Basically, the traversal state is added on a walk whenever a non-local constraint is encountered, and the traversal state is removed after the non-local constraint is satisfied. In this case, when port A1 is encountered, the traversal state is added, and when port B1 is encountered, the traversal state is removed.

We expect it is clear that propagating this traversal state along vertices is equivalent to the above graph expansion construction. Essentially, we are pushing, propagating, and popping labels onto original vertices at Dijkstra run-time rather than creating a lot of duplicate edges prior to run-time to create the equivalent graph construction.

We also note here that, during same Dijkstra run, edges will be added to copies of the $A_{FG}$ vertex with different traversal state labels associated them—we show the this in dashed boxes/edges in figure above for case of edge leaving $A_2$, where we assume $A_2$ is also subject to an ingress/egress constraint.

Proof of Heap Boundedness

Recall that Dijkstra proceeds by pursuing a diffusive expanding front from source outwards along source-connected edges, until it either reaches the destination node or can expand no further. As new vertices are considered, they are added along with their distance to a data structure called the Dijkstra heap during algorithm run-time. In approaches where an auxiliary state is introduced (in our case, copies of vertices with additional TS labels), the size of the heap can become a concern if the additional state creates many copies of the original vertices.

Fortunately, under our present construction the maximum number of vertices on heap goes from original $|V|$ to: $|V| \times$(# of ingress/egress pairs) as the maximum amount of non-trivial traversal state vertices is simply # of ingress/egress pairs. What guarantees this crucially is the fact that traversal state is set to empty upon exiting domain, rather than accumulating multiplicatively as additional ingress/egress constrained ports are encountered.

Generalization to Nested Case

The insights above can be extended to cases where a new ingress/egress condition emerges before a previous ingress reaches an egress port; we call this the "nested" generalization of the original problem. The graph construction for nested case proceeds similar to original graph construction above, as does the emergence of a traversal state. In the graph construction, entering first constrained vertex $p_1$ places on the graph $G^{(p_1)}$. From this point, entering another constrained vertex $p_2$ before first egressing correctly subject to first constraint exits onto a graph $G^{(p_1 p_2)}$ in which edges incompatible with either $p_1$ or $p_2$ ingress have been removed. The traversal state construction can be thought of correspondingly as balanced arrangement of open/closing tags that are require to always close off, e.g., for ingress-egress pairs labelled by X, Y and Z some different ways of satisfying the constraint could be expressed as different nesting:

<X><Y><Z></X></Y></Z> or <X><Y></Y><Z></Z></X> for example Note any pair that has been closed can be removed from TS state. Thus, the TS state is effectively tracking the number of open constraints in which closure is not yet satisfied by appropriate egress.

In terms of heap bounds, the traversal state could have D open levels if D is the maximum amount of nesting (D=1 in original problem statement). The heap bound analysis go through similarly, however there is linearly increasing pressure on heap size as allowed depth increases:

$$|V| \times (\text{\# of ingress/egress pairs}) \times (\text{maximum depth D}).$$

And in practice many specific nesting patterns would not appear due to topology.

Multilayer Use Case

Figure 8:
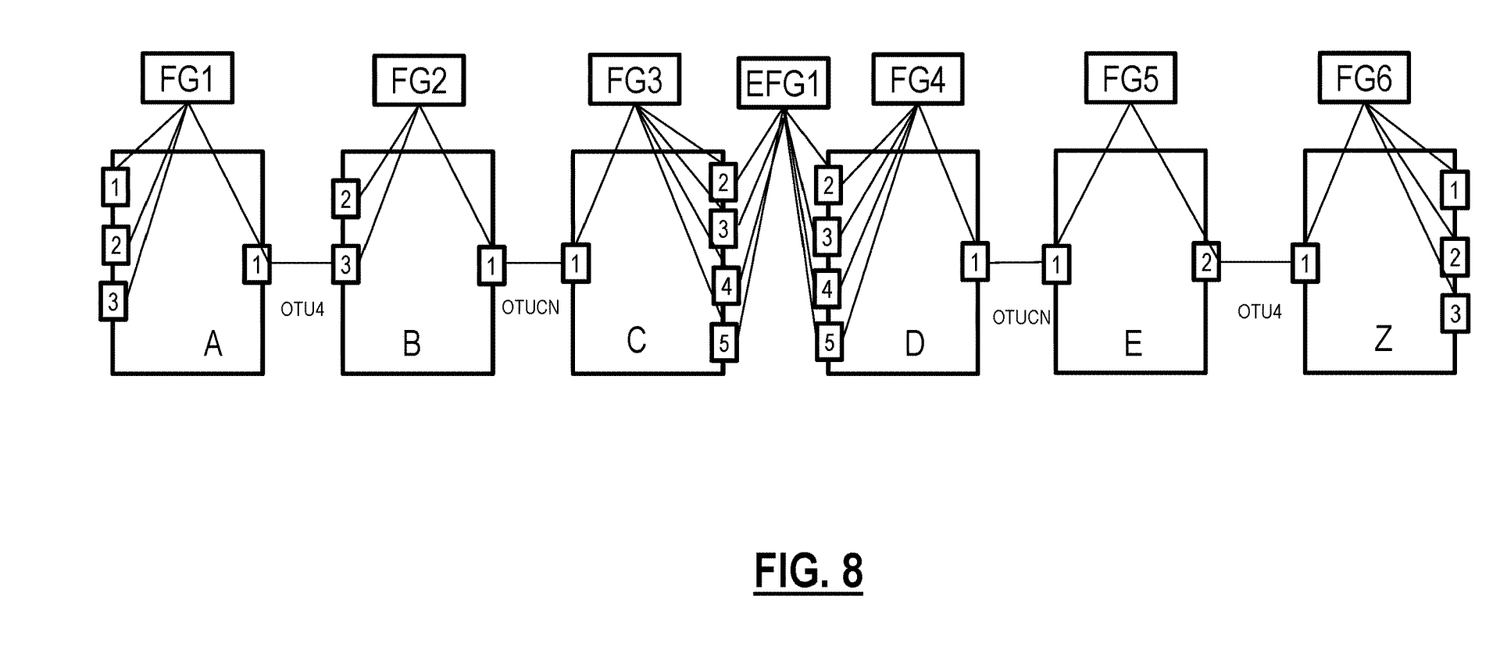
FIG. 8 is a graph of a multilayer use case.

FIG. 8 is a graph of a multilayer use case. There are concrete cases involving multiple layers and nesting. The relevant observations and constraints for this configuration are as follows:

(1) On Node A If we enter from Port 1 then on Node Z we can only exit from Port 1 only.
(2) On Node B as the OTU4 line is on Port 3, on Node C we can only come out of Port 3 only.
(3) On Node E as the OTU4 line is from Port 2, the only entry point via EFG1 to Node D is via Port 2.
(4) The problem gets more complicated if we replicate the same config in cascaded manner after Node Z in which from Node Z all the 10 ports of 10×10 G mux is connected by external FG to next node, A solution strategy drawing on nested extension above:

(P) Port 1 on Node A opens traversal state that is closed only by egress on $Z_1$ (other options forbidden).
(Q) Port 3 on Node B opens an additional traversal state that is closed only $C_3$ (other options forbidden)
(R) Port 2 on Node D opens an additional traversal state that is closed only on $E_2$. In this case, Dijkstra finds no edges for any paths leaving on $EFG1_3$, $EFG1_4$, $EFG_5$.

The nesting structure for these three constraints (if we think of them as P, Q, R) has the following schematic form:
<P><Q></Q><R></R></P>

The outer parentheses corresponds to Node A/Node Z. The first inner parentheses corresponds to Node B/Node C, and the second corresponds to Node D/Node E. The key property that bounds heap size is that parentheses always balance off, i.e., maximum number of open traversal states in this example is 2.

Distributed/Federated Multi-Domain PCE Cases

Historically influential distributed PCE approaches such as "crank-back" as well as more recent federated PCE strategies generally are set up such that each domain operator applies some form of continuing a path computation from one or more ingress boundary/hand-off points to one or more egress boundary/hand-off points. Our observations in relation to the present disclosure are:

(a) With conventional approaches, due to the need to generate all paths and then apply post-constraint, performance would be particularly poorly in distributed context, for which single-path path performance alone has been challenging.

(b) In contrast, the traversal state approach we disclose here has a simple logic that participants in distributed PCE could support, in particular allowing some generalized ingress property at a port on device in Domain-X to be propagated through and enforced at suitably marked egress ports within some other participating Domain-Y.

In summary, the traversal state approach generalizes naturally to multi-domain PCE cases.

Obtained Performance Results

Again, with the conventional approach, k-shortest path algorithm was computing thousands of invalid paths before returning the result and therefore taking time in minutes. With the new approach as disclosed here, the results come in milliseconds. In summary, we see three to four orders of magnitude improvement in practice on standard PCE test networks.

Path Computation Process with Direct Enforcement of Non-Local Constraints

Figure 9:
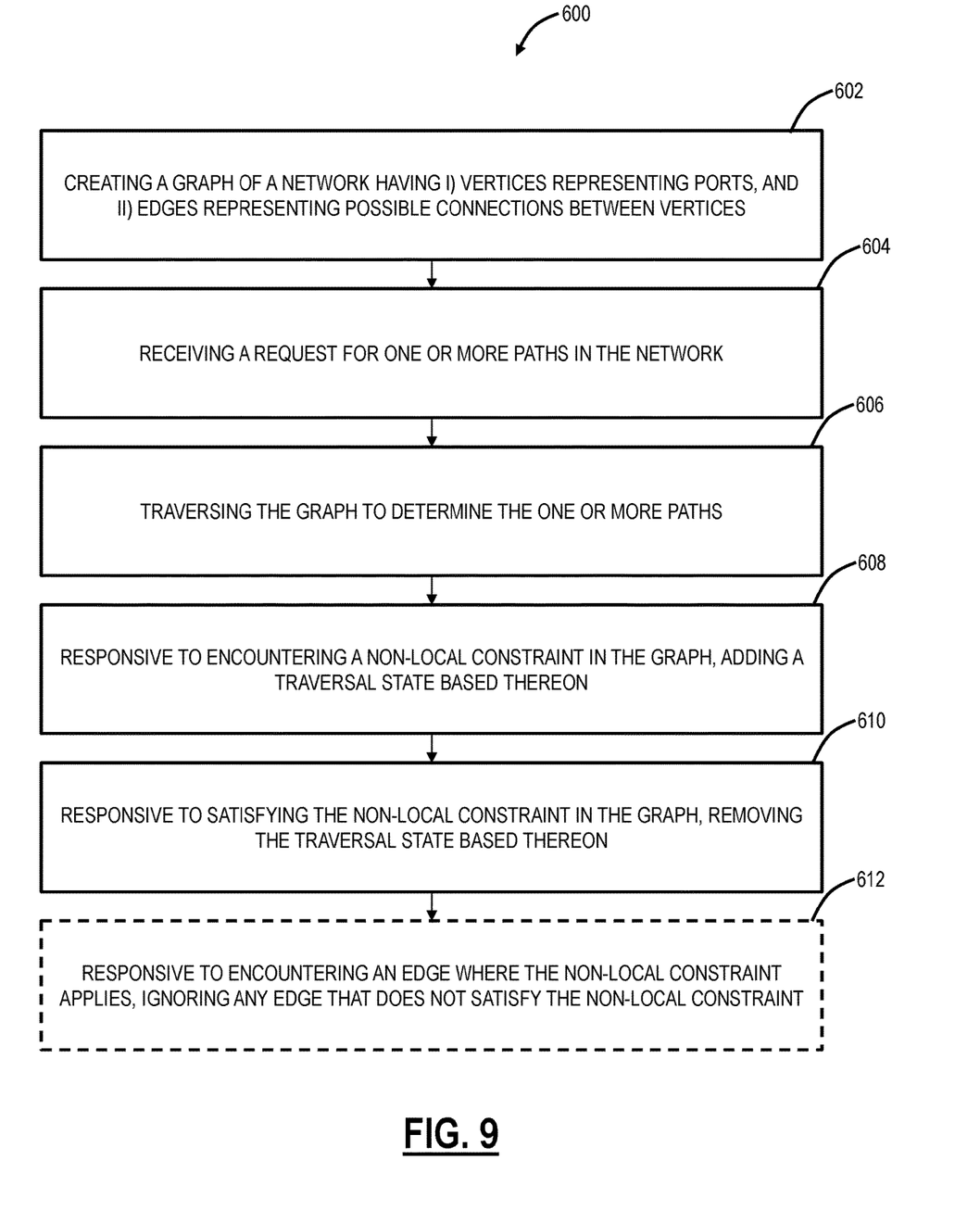
FIG. 9 is a flowchart of a path computation process with direct enforcement of non-local constraints.

FIG. 9 is a flowchart of a path computation process 600 with direct enforcement of non-local constraints. The process 600 can be a computer-implemented method having steps, via a processing device 700 having at least one processor configured to implement the steps, and as a non-transitory computer-readable medium storing instructions for the steps.

The process 600 includes creating a graph of a network having i) vertices representing ports, and ii) edges representing possible connections between vertices (step 602); receiving a request for one or more paths in the network (step 604); traversing the graph to determine the one or more paths (step 606); responsive to encountering a non-local constraint in the graph, adding a traversal state based thereon (step 608); and, responsive to satisfying the non-local constraint in the graph, removing the traversal state based thereon (step 610). The process 600 can include, responsive to encountering an edge where the non-local constraint applies, ignoring any edge that does not satisfy the non-local constraint (step 612).

The ports can include line ports and client ports associated with a network element. The vertices also can include vertices representing connectivity between the line ports and the client ports of a given network element, and vertices representing connectivity between the client ports of two different network elements. The vertices representing connectivity between the line ports and the client ports of a given network element are internal connections in the given network element, and the vertices representing connectivity between the client ports of two different network elements are cabled connections.

The non-local constraint can include a requirement that an exit client port matches an entry client port. The traversal state can include nested non-local constraints. The traversal state can include multilayer non-local constraints. The traversing the graph can utilize Dijkstra's algorithm.

Processing Device

Figure 10:
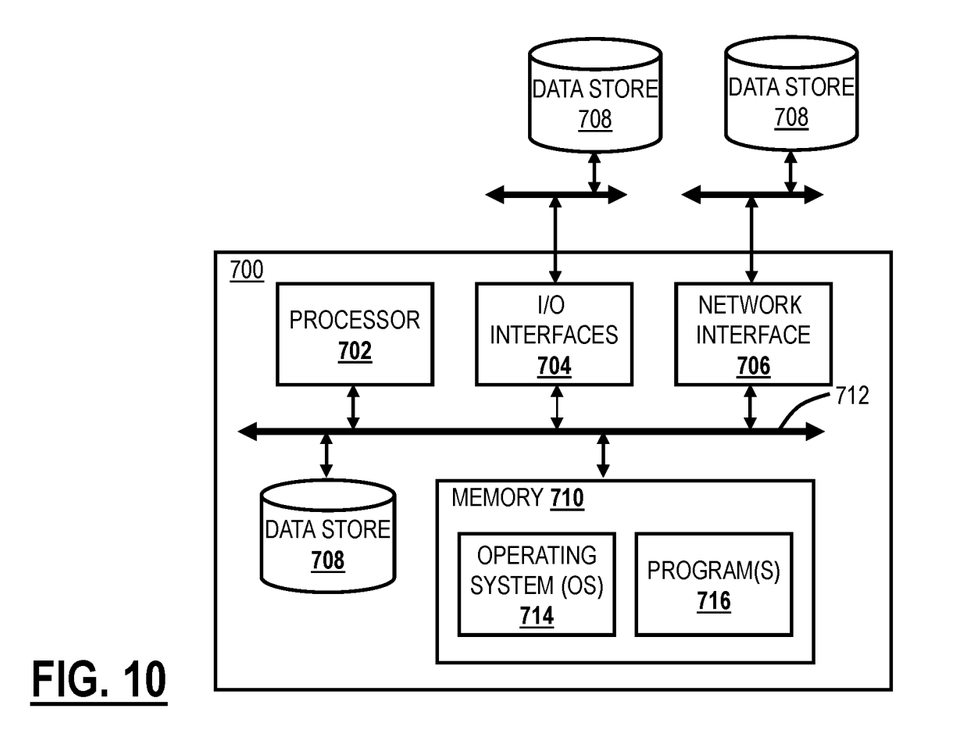
FIG. 10 is a block diagram of a processing device for use herein.

FIG. 10 is a block diagram of a processing device 700 for use herein. The processing device 700 may be a digital computer that, in terms of hardware architecture, generally includes a processor 702, input/output (I/O) interfaces 704, a network interface 706, a data store 708, and memory 710. It should be appreciated by those of ordinary skill in the art that FIG. 10 depicts the processing device 700 in an oversimplified manner, and a practical embodiment may include additional components and suitably configured processing logic to support known or conventional operating features that are not described in detail herein. The components (702, 704, 706, 708, and 710) are communicatively coupled via a local interface 712. The local interface 712 may be, for example, but not limited to, one or more buses or other wired or wireless connections, as is known in the art. The local interface 712 may have additional elements, which are omitted for simplicity, such as controllers, buffers (caches), drivers, repeaters, and receivers, among many others, to enable communications. Further, the local interface 712 may include address, control, and/or data connections to enable appropriate communications among the aforementioned components.

The processor 702 is a hardware device for executing software instructions. The processor 702 may be any custom made or commercially available processor, a Central Processing Unit (CPU), an auxiliary processor among several processors associated with the processing device 700, a semiconductor-based microprocessor (in the form of a microchip or chipset), or generally any device for executing software instructions. When the processing device 700 is in operation, the processor 702 is configured to execute software stored within the memory 710, to communicate data to and from the memory 710, and to generally control operations of the processing device 700 pursuant to the software instructions. The I/O interfaces 704 may be used to receive user input from and/or for providing system output to one or more devices or components.

The network interface 706 may be used to enable the processing device 700 to communicate on a network. The network interface 706 may include address, control, and/or data connections to enable appropriate communications on the network. A data store 708 may be used to store data. The data store 708 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 708 may incorporate electronic, magnetic, optical, and/or other types of storage media. In one example, the data store 708 may be located internal to the processing device 700, such as, for example, an internal hard drive connected to the local interface 712 in the processing device 700. Additionally, in another embodiment, the data store 708 may be located external to the processing device 700, such as, for example, an external hard drive connected to the I/O interfaces 704 (e.g., SCSI or USB connection). In a further embodiment, the data store 708 may be connected to the processing device 700 through a network, such as, for example, a network-attached file server.

The memory 710 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 710 may incorporate electronic, magnetic, optical, and/or other types of storage media. Note that the memory 710 may have a distributed architecture, where various components are situated remotely from one another but can be accessed by the processor 702. The software in memory 710 may include one or more software programs, each of which includes an ordered listing of executable instructions for implementing logical functions. The software in the memory 710 includes a suitable Operating System (O/S) 714 and one or more programs 716. The operating system 714 essentially controls the execution of other computer programs, such as the one or more programs 716, and provides scheduling, input-output control, file and data management, memory management, and communication control and related services. The one or more programs 716 may be configured to implement the various processes, algorithms, methods, techniques, etc. described herein.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A non-transitory computer-readable medium comprising instructions that, when executed, cause at least one processor to perform steps of:
creating a graph of a network having i) vertices representing ports, and ii) edges representing possible connections between vertices;
receiving a request for one or more paths in the network;
traversing the graph to determine the one or more paths;
responsive to encountering a non-local constraint in the graph, adding a traversal state based thereon, wherein the traversal state is a label added to the graph to account for the non-local constraint during the traversing; and
responsive to satisfying the non-local constraint in the graph, removing the traversal state based thereon.

2. The non-transitory computer-readable medium of claim 1, wherein the steps further include
responsive to encountering an edge where the non-local constraint applies, checking the traversal state for the edge and excluding the edge in the traversing if the edge does not satisfy the non-local constraint based on the traversal state.

3. The non-transitory computer-readable medium of claim 1, wherein the ports include line ports and client ports associated with a network element.

4. The non-transitory computer-readable medium of claim 1, wherein the graph also includes vertices with associated edges representing connectivity between the line ports and the client ports of a given network element, and vertices with associated edges representing connectivity between the client ports of two different network elements.

5. The non-transitory computer-readable medium of claim 4, wherein the vertices representing connectivity between the line ports and the client ports of a given network element are internal connections in the given network element, and
wherein the vertices representing connectivity between the client ports of two different network elements are cabled connections.

6. The non-transitory computer-readable medium of claim 1, wherein the non-local constraint includes a requirement that an exit client port matches an entry client port due to a configuration of a module in the network.

7. The non-transitory computer-readable medium of claim 1, wherein the traversal state includes nested non-local constraints.

8. The non-transitory computer-readable medium of claim 1, wherein the traversal state includes multilayer non-local constraints.

9. The non-transitory computer-readable medium of claim 1, wherein the traversing the graph utilizes Dijkstra's algorithm.

10. A method comprising steps of:
creating a graph of a network having i) vertices representing ports, and ii) edges representing possible connections between vertices;
receiving a request for one or more paths in the network;
traversing the graph to determine the one or more paths;
responsive to encountering a non-local constraint in the graph, adding a traversal state based thereon, wherein the traversal state is a label added to the graph to account for the non-local constraint during the traversing; and
responsive to satisfying the non-local constraint in the graph, removing the traversal state based thereon.

11. The method of claim 10, wherein the steps further include
responsive to encountering an edge where the non-local constraint applies, checking the traversal state for the edge and excluding the edge in the traversing if the edge does not satisfy the non-local constraint based on the traversal state.

12. The method of claim 10, wherein the ports include line ports and client ports associated with a network element.

13. The method of claim 10, wherein the vertices also include vertices representing connectivity between the line ports and the client ports of a given network element, and vertices representing connectivity between the client ports of two different network elements.

14. The method of claim 13, wherein the graph includes vertices with associated edges representing connectivity between the line ports and the client ports of a given network element are internal connections in the given network element, and
wherein the graph also includes vertices with associated edges representing connectivity between the client ports of two different network elements are cabled connections.

15. The method of claim 10, wherein the non-local constraint includes a requirement that an exit client port matches an entry client port due to a configuration of a module in the network.

16. The method of claim 10, wherein the traversal state includes nested non-local constraints.

17. The method of claim 10, wherein the traversal state includes multilayer non-local constraints.

18. The method of claim 10, wherein the traversing the graph utilizes Dijkstra's algorithm.

19. A processing device comprising:
at least one processor; and
memory comprising instructions that, when executed, cause the at least one processor to
create a graph of a network having i) vertices representing ports, and ii) edges representing possible connections between vertices;
receive a request for one or more paths in the network;
traverse the graph to determine the one or more paths;
responsive to encountering a non-local constraint in the graph, add a traversal state based thereon, wherein the traversal state is a label added to the graph to account for the non-local constraint during the traversing; and
responsive to satisfying the non-local constraint in the graph, remove the traversal state based thereon.

20. The processing device of claim 19, wherein the steps further include
responsive to encountering an edge where the non-local constraint applies, check the traversal state for the edge and exclude the edge while the graph is traversed if the edge does not satisfy the non-local constraint.

* * * * *